United States Patent Office 2,869,279
Patented Jan. 20, 1959

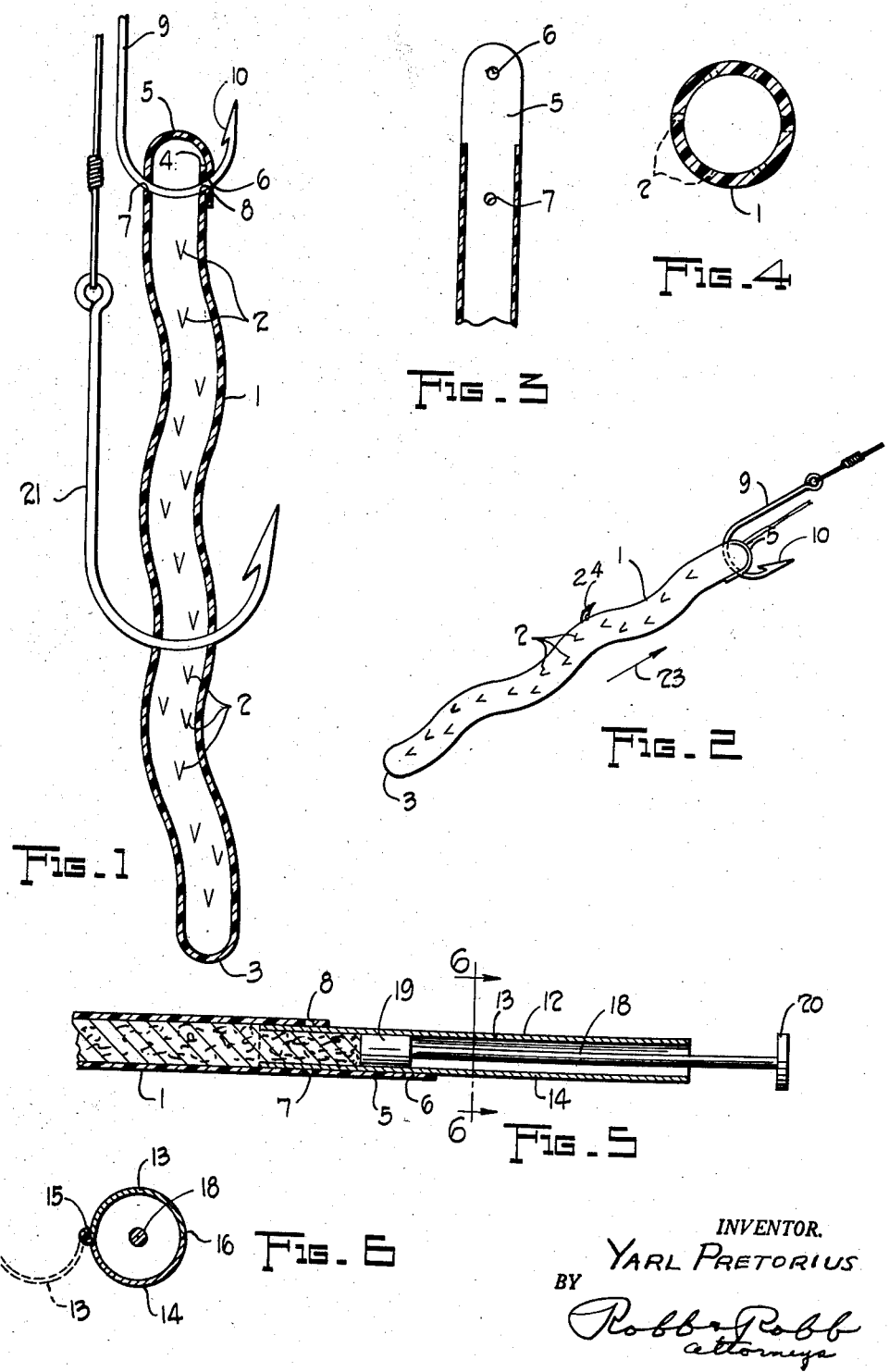

2,869,279

FISHING LURE

Yarl Pretorius, Cleveland, Ohio

Application May 18, 1956, Serial No. 585,805

5 Claims. (Cl. 43—42.06)

This invention relates to fishing and primarily to the provision of an artificial lure or bait which overcome objectionable features of natural bait without sacrificing the fish attracting advantages thereof.

While the objections to natural lure or bait are generally known, they reside primarily in the necessity to constantly obtain fresh or live bait such as worms, frogs, small fish or other types. Further after obtaining the necessary live bait, it is a problem to keep such bait alive and yet do so without a great amount of apparatus for that purpose.

Artificial lures have heretofore been made and while providing some advantages of the natural lure without some of the attendant disadvantages, do not have the fish attracting ability of such natural bait so as to presently obviate the necessity or desirability to resort to the use of live bait.

The present invention combines the advantages of live bait without many of the difficulties involved in its use, among them being the connection of such bait to a hook or the like with its attendant unpleasant manipulation.

A principal object of this invention is therefore to provide a live bait simulating member which even though made of artificial material, will so nearly represent the natural lure, that from an appearance standpoint it will be difficult to tell the difference.

In addition a further object of this invention is to so constitute the lure hereof that the food attracting characteristics of live bait will be present.

Still another object of this invention is to provide bait of the class described which may be stored indefinitely in a ready to use condition or prepared at the time of use.

A further object of the invention is to provide a lure or bait which may be formed in the shape or outline of a natural bait of any one of several different kinds, which bait is provided with means to confine a fish attracting substance therein, provisions being made for distribution or escape of such substance during use, and means being furnished for connecting the bait to a fishing line and closing and opening through which the substance mentioned is inserted.

Other and further objects of the invention will be understood from a consideration of the specification appended hereto and disclosed in the drawing wherein:

Figure 1 is an enlarged sectional view illustrating the bait or lure of this invention, the usual fish attracting substance therein being omitted, the said figure being in section.

Figure 2 is a view looking at the lure or bait similar to Figure 1 from an exterior position, the same being shown in a somewhat natural position as in use.

Figure 3 is an enlarged sectional or fragmentary view showing the closure member for the lure or bait shown.

Figure 4 is a cross sectional view of the said lure or bait of Figure 1.

Figure 5 is a fragmentary view in section showing the manner of filling a particular form of lure or bait shown in Figure 1.

Figure 6 illustrates the filling device in section and open condition in dotted line.

While the particular example of natural bait simulating member here disclosed is for example a worm, it will be apparent that the disclosure hereof is not to be limited to such particular type of bait but is obviously adaptable for varied kinds and shapes as will be readily understood from the description hereinafter set forth.

Referring therefore to Figure 1 it will be seen that here is shown a worm-like bait, comprising an elongated casing 1 which for the purposes hereof is of relatively thin cross section and may be made of any one of a number of different plastic materials such as nylon, polyethylene or other materials that are unaffected by water or food substances or similar material which may be placed therewithin. It will be understood that the casing or housing 1 is shown in a condition without any material therewithin but is normally so provided with material therewith as will be set forth subsequently.

In the casing 1 which is cylindrical as indicated in Figure 4, and which is thin obviously as explained, there are provided a series of V-shaped openings 2, the number of these openings 2 being sufficient to permit the use of the bait or lure as will be described.

The apices of the openings 2 are directed toward the closed end 3 of the casing 1 for purposes which will be clearly understood subsequently.

At the upper end of the casing 1 as shown in Figure 1, the same is provided with an opening as at 4 over which a flap such as 5, more clearly indicated in Figure 3 is adapted to be folded. The flap 5 is provided with a suitable opening such as 6 therein the opposite portions of the casing 1 being provided with similar openings 7 and 8 whereby a fish hook which is designated 9 including the barb 10 thereon may be inserted, after the flap 5 has been arranged in the condition shown in Figure 1. The fish hook 9 will therefore obviously maintain the flap 5 in its closed condition at the end of the casing 1.

As illustrated in Figures 5 and 6, the casing such as 1 is intended to be filled with a fish attracting substance which may be any one of a number of different kinds such as ground meat, ground meat mixed with other substances, some vegetable types of food, clotted blood, or other material which may be under some conditions soaked in a further substance which is known to attract fish thereto.

In order to insert such a substance within a casing such as 1, the filling device generally denoted 12 is provided, the same constituting half sections 13 and 14 of arcuate nature such as shown in Figure 6 hinged along corresponding edges at 15 and adapted to close as shown at 16.

A suitable plunger 18 is furnished having enlarged end 19 thereon with a handle portion 20 opposite thereto.

In order to effect the filling of the lure shown in Figure 1, and explain the method or manner of its use, it will be understood that initially the device shown in Figure 6 is opened so as to have the portion 13 assume the dotted line position, after which the substance to be inserted in the casing 1 is placed in the respective halves and then these halves brought into closed condition as shown in full lines in Figure 6.

Thereafter the device 12 as a whole is inserted in the casing 1 and the plunger 18 manipulated so as to cause the substance within the unit 12 to be extruded or otherwise forced therefrom, the cylindrical member being withdrawn as the plunger 18 is operated to force the food substance therefrom. Subsequently when the device has reached the position substantially as shown in Figure 5 may be completely withdrawn and thereafter the flap 5 folded over the open end.

Subsequently the hook 9 may be inserted as illustrated in Figure 1 and if desired a further hook such as 21 may be availed of and inserted in the housing or casing 1 through the V-shaped openings provided therefor.

In use the lure may assume a position such as shown in Figure 2 the hook 9 being used for attaching the same through the casing 1 the hook 21 in this instance being omitted, so that movement of the lure through the water is in the direction of the arrow 23 shown. As the lure moves through the water as illustrated, the food or fish attracting substance within the casing may be permitted to escape through the V-shaped openings and thus attract fish to the line. Obviously if the lure is not moved through the water as a whole, the substance may be permitted to dissolve and escape through the V-shaped openings in any event.

It will be readily understood that whereas a lure which is intended to simulate an earth worm is shown in the drawing, it is clear that lures of other types may be provided, such as frogs or small fish which may be formed of any one of the known substances in any of the preferred shapes thereof and thus filled and used as explained. The skill with which casings 1 may be made to simulate in appearance the outline of living creatures which are used for bait purposes is well known and thus not illustrated in or described in detail. However it should be noted that it is intended to use a casing such as 1 which is not affected by food or other fish attracting substances with which the same may be filled.

It should also be understood that since the lure or bait of this invention may be prepared in advance, the same may be stored under refrigerated conditions for an indefinite period and there is no difficulty in providing for use of the same thereafter. On the other hand it may under certain conditions be desirable to prepare the lure or bait as needed and thus the arrangement described and illustrated in Figures 5 and 6 may be availed of, or some other means be provided for filling such hollow members.

It is further pointed out that whereas the drawing discloses the various hooks such as 9 and 21 extending entirely through the housing or casing 1, it is entirely within the scope hereof to insert the hook through the casing by means of locating the same in the interior and having it extend to the exterior in the manner such as the hook 21 without passing through more than one wall or one opposite wall of the said casing. Obviously, too, hooks with more than one barbed section may be used and these may include double or even triple barbs. The end 24 of such a hook is shown extending from the casing 1 in Figure 2, it being noted that the connection with the fishing line to which the hook 9 is attached is readily provided for.

I claim:
1. In a fishing lure of the class described, in combination, a natural bait simulating member constituting a flexible, relatively thin walled elongated closed casing, said casing being provided with an opening for inserting a fish attractive substance, said casing further being provided with a plurality of openings covered by flexible flaps which are normally closed and which facilitate gradual distribution of said substance during use of the lure, and means including a fish hook to connect the lure to a fishing line.

2. The combination as claimed in claim 1, wherein the thin walled casing is an elongated member closed at one end, the opening is at the other end, said casing being provided with a flap designed to be folded over to close said opening, and the connecting means is so mounted as to maintain said flap in closed condition and likewise effect the connecting action.

3. The combination as claimed in claim 1, wherein the plurality of openings comprise V-shaped cuts forming the flexible flaps in the wall of said casing, the apices of the cuts being arranged in one direction toward an end of the said casing.

4. A lure as claimed in claim 1, wherein the said opening is provided with a closing flap, the said fish hook connecting the lure to a fishing line and also acting to maintain the flap in closed condition.

5. The method of preparing an artificial lure for fishing which comprises, forming an elongated tubular casing with a closed end, cutting a series of V-shaped slits in the casing with the apices directed toward the closed end aforesaid, introducing a cylindrical filling device into the casing, said device having a fish attracting substance therein, withdrawing the said device whilst forcing the substance therefrom to thereby completely fill the casing, closing a flap on the casing, and introducing a fish hook into openings provided in the flap and casing to maintain the said casing in closed condition.

References Cited in the file of this patent

UNITED STATES PATENTS

| | | |
|---|---|---|
| 1,991,827 | Todd | Feb. 19, 1935 |
| 2,102,739 | Peters | Dec. 21, 1937 |
| 2,307,181 | Young | Jan. 5, 1943 |
| 2,544,265 | Kelly et al. | Mar. 6, 1951 |
| 2,555,088 | Irvin | May 29, 1951 |
| 2,556,702 | Nielsen | June 12, 1951 |
| 2,623,276 | Hale | Mar. 24, 1953 |
| 2,740,226 | Arff | Apr. 3, 1956 |
| 2,749,647 | Beloff | June 12, 1956 |